United States Patent

Kamiyama et al.

Patent Number: 6,162,545
Date of Patent: Dec. 19, 2000

[54] AGENT FOR PROVIDING AN ELECTROSTATIC COATING PROPERTY AND IMPROVING THE WATER RESISTANCE OF A COATING FILM, AN ELECTROSTATICALLY COATED RESIN MOLDED ARTICLE, AND AN ELECTROSTATIC COATING METHOD

[75] Inventors: Shiro Kamiyama; Katsumi Kohama, both of Saitama; Hisashi Masuda, Tokyo; Takeo Okada, Saitama; Eiji Inada, Kyoto, all of Japan

[73] Assignees: Honda Giken Kogyo Kabushiki Kaisha, Tokyo; Sanyo Chemical Industries, Ltd., Kyoto, both of Japan

[21] Appl. No.: 09/242,165

[22] PCT Filed: Mar. 9, 1998

[86] PCT No.: PCT/JP98/00957

§ 371 Date: Feb. 10, 1999

§ 102(e) Date: Feb. 10, 1999

[87] PCT Pub. No.: WO99/46328

PCT Pub. Date: Sep. 16, 1999

[51] Int. Cl.$^7$ .......................... B32B 27/18; B32B 27/28; B32B 27/30; C08L 77/00
[52] U.S. Cl. ..................... 428/412; 428/500; 428/523; 524/902; 524/912; 525/92 A; 525/133; 525/178; 525/182; 525/183; 525/184
[58] Field of Search .................... 428/500, 523, 428/412; 525/92 A, 133, 178, 182, 183, 184; 524/902, 912

[56] References Cited

U.S. PATENT DOCUMENTS

| | | | |
|---|---|---|---|
| 5,194,328 | 3/1993 | Suzuki et al. | 428/328 |
| 5,449,702 | 9/1995 | Tayama et al. | 552/4 |
| 5,604,284 | 2/1997 | Ueda et al. | 524/434 |
| 5,652,326 | 7/1997 | Ueda et al. | 528/288 |
| 5,886,098 | 3/1999 | Ueda et al. | 525/66 |

FOREIGN PATENT DOCUMENTS

| | | |
|---|---|---|
| 48-8322 | 2/1973 | Japan. |
| 60-023435 | 2/1985 | Japan. |
| 63-095251 | 4/1988 | Japan. |
| 1-144417 | 6/1989 | Japan. |
| 3-258850 | 11/1991 | Japan. |
| 6-345927 | 12/1994 | Japan. |
| 8-012755 | 1/1996 | Japan. |
| 8-48768 | 2/1996 | Japan. |
| 8-311331 | 11/1996 | Japan. |
| 9-087494 | 3/1997 | Japan. |

OTHER PUBLICATIONS

Loudon, Organic Chemistry, 2nd Edition, p. 881, 1988.

Primary Examiner—Paul Thibodeau
Assistant Examiner—Ramsey Zacharia
Attorney, Agent, or Firm—Merchant & Gould P.C.

[57] ABSTRACT

An agent for providing an electrostatic coating property and improving the water resistance of a coating film comprises 100 weight parts of an aromatic ring-containing polyether-esteramide (A) derived from a polyamide having carboxyl groups at both ends and having a number average molecular weight of 500 to 5,000 and an alkylene oxide adduct of bisphenols having a number average molecular weight of 1,600 to 3,000; and 5 to 100 weight parts of a vinyl copolymer comprising as essential constituent units a vinyl monomer (b1) having a sulfonic acid (or sulfonate) group and at least one monomer (b2) selected from vinyl monomers having a functional group that is reactive with (A). Thus, an agent for providing an electrostatic coating property and improving the water resistance of a coating film that allows electrostatic coating immediately after molding without the coating of a conductive primer for under coating in electrostatically coating a styrene-based resin molded article and provides an excellent water resistance for a coating film after coating, and an electrostatically coated resin molded article using the same are provided.

19 Claims, No Drawings

AGENT FOR PROVIDING AN ELECTROSTATIC COATING PROPERTY AND IMPROVING THE WATER RESISTANCE OF A COATING FILM, AN ELECTROSTATICALLY COATED RESIN MOLDED ARTICLE, AND AN ELECTROSTATIC COATING METHOD

TECHNICAL FIELD

The present invention relates to an agent for providing an electrostatic coating property and improving the water resistance of a coating film, an electrostatically coated resin molded article, and an electrostatic coating method. More particularly, the present invention relates to an agent for providing an electrostatic coating property and improving the water resistance of a coating film that allows electrostatic coating immediately after molding without the coating of a conductive primer for under coating in electrostatically coating a styrene-based resin molded article and provides an excellent water resistance for a coating film after coating, an electrostatically coated resin molded article using the same, and an electrostatic coating method using the same.

BACKGROUND ART

Conventionally, many molded articles of styrene-based resins, such as ABS resin, have excellent electrical insulation. In electrostatically coating the molded article, the surface of the molded article to be coated should be conductive. As a method for making the resin surface conductive, a method for coating the resin surface with a conductive primer or a method for kneading the resin and a metal filler, such as a conductive carbon, is usually used. However, with the method for coating the resin surface with a conductive primer, variations in the film thickness of the conductive primer deteriorates the electrostatic coating property (the coating efficiency). In addition, the primer coating step makes the process complicated. Furthermore, with the method for kneading the resin and a conductive filler, if the filler is poorly dispersed, a coating unevenness occurs and the impact strength of the resin decreases.

In general, in order to electrostatically coat the resin molded article with good efficiency, the article to be coated should be a conductive material (a surface resistivity of $10^{10}$ Ω or less). Conventionally, as a method for decreasing the surface resistivity of the resin, for example, ① a method for kneading the resin and a surfactant having a low molecular weight or coating the resin with the surfactant, and ② a method for kneading a polyamide-based elastomer having a high molecular weight generally called a permanently antistatic agent (Japanese Patent Application (Tokko Hei) No. 4-72855) are disclosed.

However, with the above method ①, the desired conductivity cannot be provided in many cases because the antistatic agent is washed off when a washing treatment is performed in a degreasing step before coating. In addition, even if coating can be performed, the antistatic agent bleeds onto the surface of a coating film after coating, causing blisters (surface roughness). Therefore, this method is substantially difficult to use. With the method ②, the bleeding problems as in ① is eliminated because a material having a high molecular weight is used. However, since a generally used polyamide-based elastomer comprises polyoxyalkylene glycol whose constituent unit is an oxyethylene group for providing conductivity, the water resistance is poor, deteriorating the water resistance and adhesion of the coating film significantly.

DISCLOSURE OF INVENTION

In view of the above prior art problems, it is an object of the present invention to provide an agent for providing an electrostatic coating property and improving the water resistance of a coating film that allows electrostatic coating immediately after molding without coating a resin molded article with a conductive primer, without causing the blisters of the resin surface, and without deteriorating the water resistance and the mechanical strength, and provides excellent water resistance for a coating film after coating.

The inventors have made keen examinations to solve the above problems and found that mixing a resin composition comprising a specific polyetheresteramide and a specific vinyl copolymer in a polystyrene-based resin molded article for a vehicle c an provide an electrostatic coating property for the molded article and improve the water resistance of a coating film.

The present invention includes [1] an agent for providing an electrostatic coating property and improving the water resistance of a coating film used for a styrene-based resin molded article, the agent being used as a component to be mixed in the resin molded article and comprising 100 weight parts of the following polyetheresteramide (A) and 5 to 100 weight parts of the following copolymer (B), wherein a part or all of the polyetheresteramide (A) and the copolymer (B) may be reacted; [2] an agent for improving the water resistance of a polyetheresteramide-based agent that provides an electrostatic coating property and is used for a styrene-based resin molded article, comprising the following copolymer (B); [3] a styrene-based resin molded article formed by kneading a styrene-based resin (C) and the agent for providing an electrostatic coating property and improving the water resistance of a coating film and molding the kneaded material into a desired shape; [4] the styrene-based resin molded article that is electrostatically coated; [5] a vehicle member comprising the styrene-based resin molded article; [6] an electrostatic coating method comprising the step of mixing the following (A) and (B) in a styrene-based resin:

(A) an aromatic ring-containing polyetheresteramide derived from a polyamide (a1) having carboxyl groups at both ends and having a number average molecular weight of 500 to 5,000 and an alkylene oxide adduct of bisphenols (a2) having a number average molecular weight of 1,600 to 3,000, the polyetheresteramide having a reduced viscosity of 0.5 to 4.0 (a 0.5 wt. % m-cresol solution, 25° C.); and (B) a vinyl copolymer comprising as essential consitituent units a vinyl monomer (b1) having a sulfonic acid (or sulfonate) group and at least one monomer (b2) selected from vinyl monomers having a functional group that is reactive with (A).

BEST MODE FOR CARRYING OUT THE INVENTION

The polyetheresteramide (A) in the present invention is used as a component for providing an electrostatic coating property. Since the polyetheresteramide (A) comprises the constituent unit of an alkylene oxide adduct of bisphenols as a conductivity-providing component, the polyetheresteramide (A) has better water resistance and better heat resistance than polyetheresteramides comprising the constituent unit of polyoxyalkylene glycol whose main component is polyethylene glycol. Furthermore, the polyetheresteramide (A) is effective for improving the water resistance of a coating film after coating. As the polyetheresteramide comprising the constituent unit of an alkylene oxide adduct of bisphenols as the conductivity-providing component, a polyetheresteramide comprising an alkylene oxide adduct of bisphenols having a relatively low molecular weight (an adduct molar number of 30 moles or less) and polyoxyalkylene glycol, for example, polyethylene glycol, as polyether components, as described in Japanese Patent Application (Tokkai Hei) No. 1-144417, and a polyetheresteramide comprising an alkylene oxide adduct of bisphenols having a high molecular weight (an adduct molar number of 32 to 60 moles) solely as the polyether component, as described in U.S. patent application Ser. No. 08/203399 (corresponding to EP0613919A1), are known. The latter is preferable in satisfying the water resistance and the conductivity provision because it uses the alkylene oxide adduct of bisphenols having a high molecular weight solely.

The polyamide (a1) having carboxyl groups at both ends, which is a constituent unit of the polyetheresteramide (A), is (1) a ring-opening polymer of lactam, (2) a polycondensation product of amino carboxylic acid, or (3) a polycondensation product of dicarboxylic acid and diamine. Examples of the lactam of (1) are caprolactam, enantholactam, laurolactam, and undecanolactam. Examples of the amino carboxylic acid of (2) are ω-amino caproic acid, ω-aminoenanthic acid, ω-aminocaprylic acid, ω-aminopelargonic acid, ω-aminocapric acid, ω-aminoundecanoic acid, and 12-aminododecanoic acid. Examples of the dicarboxylic acid of (3) are adipic acid, azelaic acid, sebacic acid, undecane dicarboxylic acid, dodecane dicarboxylic acid, and isophthalic acid. Examples of the diamine are hexamethylene diamine, heptamethylene diamine, octamethylene diamine, and decamethylene diamine. Two or more of the amide-forming monomers as illustrated above may be used together. Among them, caprolactam, 12-aminododecanoic acid, and adipic acid-hexamethylene diamine are preferable. Caprolactam is most preferable.

(a1) is obtained by the ring-opening polymerization or polycondensation of the above amide-forming monomer by the usual method in the presence of a dicarboxylic acid component having 4 to 20 carbons used as a molecular weight modifier. Examples of the dicarboxylic acid having 4 to 20 carbons are aliphatic dicarboxylic acids, such as succinic acid, glutaric acid, adipic acid, pimelic acid, suberic acid, azelaic acid, sebacic acid, undecane dicarboxylic acid, and dodecane dicarboxylic acid; aromatic dicarboxylic acids, such as terephthalic acid, isophthalic acid, phthalic acid, and naphthalene dicarboxylic acid; alicyclic dicarboxylic acids, such as 1,4-cyclohexane dicarboxylic acid and dicyclohexyl-4,4-dicarboxylic acid; and 3-sulfoisophthalic acid alkali metal salts, such as sodium 3-sulfoisophthalate and potassium 3-sulfoisophthalate. Among them, aliphatic dicarboxylic acids, aromatic dicarboxylic acids, and 3-sulfoisophthalic acid alkali metal salts are preferable. Adipic acid, sebacic acid, terephthalic acid, isophthalic acid, and sodium 3-sulfoisophthalate are more preferable.

The number average molecular weight of the above (a1) is generally 500 to 5,000, and preferably 500 to 3,000. With a number average molecular weight of less than 500, the heat resistance of the polyetheresteramide decreases. With a number average molecular weight of more than 5,000, the reactivity decreases, requiring a prolonged time of manufacturing the polyetheresteramide.

Examples of the bisphenols of the alkylene oxide adduct of bisphenols (a2) are bisphenol A (4,4'-dihydroxydiphenyl-2,2-propane), bisphenol F (4,4'-dihydroxydiphenylmethane), bisphenol S (4,4'-dihydroxydiphenyl sulfone) and 4,4'-dihydroxydiphenyl-2,2-butane. Among them, bisphenol A is preferable. (a2) is obtained by the addition of alkylene oxide to these bisphenols by the usual method. As the alkylene oxide, along with ethylene oxide, other alkylene oxides (such as propylene oxide, 1,2-butylene oxide, and 1,4-butylene oxide) can be used. The amount of the other alkylene oxides is generally 10 wt. % or less with respect to the amount of the ethylene oxide.

The number average molecular weight of the above (a2) is generally 1,600 to 3,000. It is particularly preferable to use one having an ethylene oxide adduct molar number of 32 to 60. With a number average molecular weight of less than 1,600, the conductivity of the resin molded article is insufficient. With a number average molecular weight of more than 3,000, the reactivity decreases, requiring a prolonged time of manufacturing the polyetheresteramide.

The amount of (a2) is preferably in the range of 20 to 80 wt. % with respect to the total weight of the above (a1) and (a2). If the amount of (a2) is too small, the conductivity of the resin molded article tends to be insufficient. If the amount of (a2) is too large, the heat resistance of (A) tends to decrease.

The preparation of the polyetheresteramide (A) is illustrated by the following preparation ① or ② but is not limited to these.

Preparation ①: a method comprising reacting an amide-forming monomer and dicarboxylic acid to form (a1) and adding (a2) to (a1) for a polymerization reaction at a high temperature and a reduced pressure.

Preparation ②: a method comprising feeding an amide-forming monomer and dicarboxylic acid to a reaction vessel at the same time for a pressure reaction at a high temperature in the presence or absence of water to form (a1) as an intermediate product and then performing the polymerization reaction of (a1) and (a2) at a reduced pressure.

A known esterification catalyst usually is used for the polymerization reaction. Examples of the catalyst are an antimony-based catalyst, such as antimony trioxide; a tin-based catalyst, such as monobutyl tin oxide; a titanium-based catalyst, such as tetrabutyl titanate; a zirconium-based catalyst, such as tetrabutyl zirconate; and an acetic acid metal salt-based catalyst, such as zinc acetate. The amount of the catalyst is generally 0.1 to 5 wt. % with respect to the total weight of (a1) and (a2).

The reduced viscosity of (A) is generally 0.5 to 4.0 (a 0.5 wt. % m-cresol solution, 25° C.), and preferably 0.6 to 3.0. With a reduced viscosity of less than 0.5, the heat resistance is poor. With a reduced viscosity of more than 4.0, the moldability decreases. In addition, it is known that with a molding method that applies a high shearing stress, such as injection molding, a polymer having a low melt viscosity moves onto a surface and covers a polymer having a high melt viscosity during molding. In case of kneading (A) and the styrene-based resin (C), it is preferable that the melt viscosity of (A) at the molding temperature is lower than that of (C). In this case, (A) moves onto the surface, so that the conductivity of the resin molded article improves and the electrostatic coating property further improves. If the reduced viscosity of (A) is more than 4.0, the melt viscosity of (A) during molding is higher than that of (C). Therefore, the surface migration property deteriorates.

In the present invention, the vinyl copolymer (B) is used with (A) and used as a component of the agent for improving the water resistance of the coating film of an electrostatically coated molded article. (B) is a vinyl copolymer comprising as essential constituent units a vinyl monomer (b1) having a sulfonic acid (or sulfonate) group and one or more monomers (b2) selected from vinyl monomers having a functional group that is reactive with (A) (for example, at least one functional group selected from the group consisting of a carboxyl group, an epoxy group, an amino group, and a hydroxyl group). Furthermore, the reaction of (A) and a part or all of (b2) improves the water resistance of the coating film of the molded article.

Examples of the vinyl monomer (b1) having a sulfonic acid (or sulfonate) group, which is an essential constituent unit of (B), are at least one vinyl monomer selected from the group consisting of aromatic vinylsulfonic acid, p- and o-styrene sulfonic acid, styrene disulfonic acid, α-methylstyrene sulfonic acid, vinylphenylmethane sulfonic acid, (meth)acrylamide having sulfonic acid, (meth)acrylate having sulfonic acid, and aliphatic vinylsulfonic acid; alkali metal salts thereof; alkaline earth metal salts thereof; ammonium salts thereof; organic amine salts thereof; and quaternary ammonium salts thereof. Among them, aromatic vinylsulfonic acid (or salts thereof) is preferable in improving the compatibility with the styrene-based resin. Here, "sulfonic acid (or salts thereof)" means "sulfonic acid" or "sulfonate", and "(meth)acryl . . . " means "acryl . . . " or "methacryl . . . ". These are the same with the following description.

The vinyl monomer (b2) having a functional group that is reactive with (A), which is an essential constituent unit of (B), includes a vinyl monomer having a functional group that is reactive with a carboxyl group and/or a hydroxyl group and/or an amide group present in (A). A specific example of the vinyl monomer is a vinyl monomer having at least one functional group selected from the group consisting of a carboxyl group, an epoxy group, an amino group, a hydroxyl group, and derivatives thereof, as described in Japanese Patent Application (Tokkai Hei) No. 3-258850. Specific examples of the vinyl monomer having a carboxyl group are acrylic acid, methacrylic acid, maleic acid, maleic anhydride, phthalic acid, and itaconic acid. Specific examples of the vinyl monomer having an epoxy group are glycidyl acrylate, glycidyl methacrylate, glycidyl ethacrylate, and glycidyl itaconate. Specific examples of the vinyl monomer having an amino group are alkyl acrylate or methacrylate-based derivatives, such as aminoethyl acrylate, propylaminoethyl acrylate, methylaminoethyl methacrylate, ethylaminopropyl methacrylate, phenylaminoethyl methacrylate, and cyclohexylaminoethyl methacrylate; vinylamine-based derivatives, such as N-vinyldiethylamine and N-acetylvinylamine; and aminostyrenes, such as p-aminostyrene. Specific examples of the vinyl monomer having a hydroxyl group are (poly)ethylene glycol acrylate, (poly)ethylene glycol methacrylate, (poly)(propylene oxide) glycol acrylate, (poly)(propylene oxide) glycol methacrylate, (poly)(tetramethylene oxide) glycol acrylate, and (poly)(tetramethylene oxide) glycol methacrylate. Among them, the vinyl monomer having an epoxy group is preferable in the reactivity with (A).

(B) comprises as essential constituent units a vinyl monomer (b1) having a sulfonic acid (or sulfonate) group and one or more monomers (b2) selected from vinyl monomers having a functional group that is reactive with (A) and is obtained by the copolymerization of these and other vinyl monomers as required. The other vinyl monomers are not particularly limited. For example, one or more vinyl monomers can be selected from the group consisting of an aromatic vinyl monomer, such as styrene; a vinyl cyanide monomer, such as (meth)acrylonitrile; a (meth)acrylic ester monomer, such as methyl methacrylate; an α, β-unsaturated carboxylic acid (or anhydride) monomer, such as (meth)acrylic acid; a maleimide monomer; an olefin-based monomer; and a vinyl monomer, such as vinyl chloride, according to the purpose. Among them, a vinyl monomers that is a component of the styrene-based resin (C) is preferably copolymerized to improve the compatibility with (C). When (C) is an acrylonitrile/butadiene/styrene copolymer, a vinyl cyanide monomer, such as (meth)acrylonitrile, and/or an aromatic vinyl monomer, such as styrene, are preferably copolymerized.

The method for preparing (B) is not particularly limited. Examples of the method are bulk polymerization, solution polymerization, suspension polymerization, and emulsion polymerization in the presence of a known polymerization initiator.

Other than obtaining (B) by the above polymerization, (B) comprising (b1) and (b2) as constituent units may be formed by directly sulfonating a vinyl copolymer comprising (b2) as a constituent unit with a sulfonating agent, such as sulfuric acid or chlorosulfonic acid.

The number average molecular weight of the vinyl copolymer (B) is not particularly limited. The number average molecular weight is generally 1,000 to 200,000, and preferably 5,000 to 100,000.

Mixing (A) and (B) in the styrene-based resin molded article can provide the resin molded article that has an electrostatic coating property and provides an excellent water resistance for a coating film after coating. If a part or all of (A) and (B) are reacted, sufficient effects are obtained. Even if unreacted (A) or (B) is present in part in the molded article, the action of the reaction product obtained from (A) and (B) improves the compatibility with the styrene-based resin. Therefore, the water resistance of the coating film after coating improves. The ratio of (A) to (B) is preferably 100 weight parts of (A) to 5 to 100 weight parts of (B), and more preferably 100 weight parts of (A) to 25 to 100 weight parts of (B). If the ratio of (B) is less than 5 weight parts, the water resistance of the coating film after coating decreases.

The method for reacting (A) and (B) is not particularly limited. Examples of the method are a method of melt kneading (A) and (B) with an extruder at 200 to 230° C. for reaction, and a method of adding (B) for reaction before kneading with (C) during or after the preparation of (A). The method using an extruder is preferable in the simplicity of the reaction.

In the present invention, the styrene-based resin (C) includes a (co)polymer comprising 50 mol % or more of at least one of styrenes, such as styrene and α-methylstyrene. Specific examples of the styrene-based resin (C) are polystyrene, a styrene/acrylonitrile copolymer, a styrene/methyl methacrylate copolymer, a styrene/butadiene copolymer, an acrylonitrile/butadiene/styrene copolymer, a methyl methacrylate/butadiene/styrene copolymer, and a styrene/methyl methacrylate/acrylonitrile copolymer. Among them, the acrylonitrile/butadiene/styrene copolymer is preferable.

In the present invention, other thermoplastic polymers, for example, polyamide, polyester (such as polyethylene terephthalate and polybutylene terephthalate), polycarbonate, polyphenylene ether, polyolefin (such as polyethylene and polypropylene), and an elastomer, such as a hydrogenated styrene-butadiene-based block copolymer, can be used as a component to be mixed in the styrene-based resin molded article within the range not preventing the object of the present invention. The amount of the other thermoplastic polymers is preferably 300 weight parts or less with respect to 100 weight parts of the styrene-based resin (C). Among these thermoplastic polymers, polycarbonate is preferable.

The agent for providing an electrostatic coating property and improving the water resistance of a coating film according to the present invention is used by mixing generally 5 to 40 wt. % of (A) and 0.25 to 40 wt. % of (B) in the styrene-based resin molded article. From the aspect of providing the electrostatic coating property and the water resistance of the coating film after coating for the resin molded article, 5 to 40 wt. % of (A) and 1.25 to 40 wt. % of (B) are preferably mixed. The total weight of (A) and (B) in the resin molded article is generally 5.25 to 50 wt. %, and preferably 6.25 to 30 wt. %. If the total weight of (A) and (B) in the resin molded article is less than 5.25 wt. %, the electrostatic coating property of the resin molded article deteriorates. If the total weight of (A) and (B) is more than 50 wt. %, the mechanical strength of the resin molded article deteriorates.

The agent for providing an electrostatic coating property and improving the water resistance of a coating film according to the present invention and/or the styrene-based resin may comprise a known alkali metal and/or alkaline earth metal salt (D) to the degree of not causing blisters (surface roughness) after coating to further improve the conductivity. (D) includes alkali metals and/or alkaline earth metal salts of organic acids, inorganic acids, halides and the like, for example, lithium acetate, potassium acetate, lithium chloride, sodium chloride, potassium chloride, magnesium chloride, calcium chloride, sodium bromide, potassium bromide, magnesium bromide, potassium perchlorate, potassium sulfate, potassium phosphate, and potassium thiocyanate. Among them, sodium chloride, potassium chloride, and potassium acetate are preferable.

The amount of (D) when it is used is generally not more than 5 weight parts with respect to the total weight of (A), (B) and (C), and preferably 0.01 to 3 weight parts. If the amount of (D) is more than 5 weight parts, blisters are caused after coating, thereby spoiling the appearance of the molded article and decreasing the mechanical strength.

The method for adding (D) is not particularly limited. In order to disperse (D) effectively in the resin molded article, it is desirable to disperse (D) previously in (A), which is a component of the agent for providing an electrostatic coating property and improving the water resistance of a coating film according to the present invention. In case of dispersing (D) in (A), it is desirable to add and disperse (D) previously during the preparation of (A).

The agent for providing an electrostatic coating property and improving the water resistance of a coating film according to the present invention and/or the styrene-based resin molded article comprising the agent for providing an electrostatic coating property and improving the water resistance of a coating film may comprise a known nonionic, anionic, cationic or amphoteric surfactant (E) to the degree of not causing blisters after coating to further improve the conductivity. Among them, the anionic surfactant is preferable. Sulfonates, such as alkylbenzensulfonate, alkylsulfonate, and paraffin sulfonate, are more preferable.

The amount of (E) when it is used is generally not more than 5 weight parts with respect to the total weight of (A), (B) and (C), preferably 0.1 to 5 weight parts, and more preferably 0.4 to 3 weight parts. If the amount of (E) is more than 5 weight parts, blisters are caused after coating, thereby spoiling the appearance of the molded article and decreasing the mechanical strength.

The method for adding (E) is not particularly limited. In order to disperse (E) effectively in the resin molded article, it is desirable to disperse (E) previously in (A), which is a component of the agent for providing an electrostatic coating property and improving the water resistance of a coating film according to the present invention, or the styrene-based resin (C).

The method for molding the styrene-based resin molded article comprising the agent for providing an electrostatic coating property and improving the water resistance of a coating film according to the present invention is not particularly limited. Usually, the resin molded article can be obtained by a known molding method, such as injection molding, extrusion molding, vacuum molding, or press molding, after kneading the components with a known mixer. Examples of the mixer are a single-screw extruder, a double-screw extruder, a Brabender, a kneader, and a Banbury mixer.

The order of adding the components during kneading is not particularly limited. For example, ① a method of blending and kneading (A) to (C), ② a method of blending and kneading (A) and (B) as well as a small amount of (C) and then kneading the remaining (C), or ③ a method of blending and kneading (A) and (B) to make the agent for providing an electrostatic coating property and improving the water resistance of a coating film according to the present invention and kneading (C) is used. ② is called masterbatching or masterpelletizing. The method ② is most preferable because it provides a good dispersibility, an excellent water resistance for the coating film after coating, and an excellent mechanical strength.

Other known additives for resin can be added to the agent for providing an electrostatic coating property and improving the water resistance of a coating film and/or the styrene-based resin molded article according to the present invention as required within the range not deteriorating the properties of the molded article. Examples of the additive are a pigment, a dye, a filler, a nucleating agent;, a glass fiber, a lubricant, a plasticizer, a mold releasing agent, an antioxidant, a flame retardant, and an ultraviolet absorbing agent.

In electrostatically coating the styrene-based resin molded article, any general electrostatic coater can be used. This device comprises a paint atomizer and a discharge electrode at a tip of an electrical insulator. The atomization mechanism includes electric atomization, airless atomization, and the like. In addition, the form of the discharge electrode includes a fixed type and a rotary type.

The coating form may be an automatic type, a stationary type, or a hand carry type. In carrying out the electrostatic coating in the present invention, a device combining these (for example, an automatic electrostatic rotary atomizer) is used.

The electrostatic coating method in the present invention can be a method usually performed with a general device for metal coating or the like. A special device is not necessary, and a special method is not necessary. With respect to the electrostatic field formation range during electrostatic coating, generally, the coating efficiency improves as the voltage is higher because the force of the positive and negative electrodes pulling each other acts strongly. The electrostatic coating is usually performed at 60 to 100 KV.

On the other hand, the paint used for the electrostatic coating includes a polyestermelamine resin-based paint, an epoxymelamine resin-based paint, an acrylmelamine resin-based paint, an acrylurethane resin-based paint, an urethane resin-based paint, an acrylic resin-based paint, an unsaturated polyester resin-based paint, and a silicone resin-based paint. However, the paint is not limited to these. In addition, the coating thickness (the dry film thickness) can be selected properly according to the purpose. The coating thickness is usually 10 to 50 µm.

The application of the styrene-based resin molded article comprising the agent for providing an electrostatic coating property and improving the water resistance of a coating film according to the present invention includes interior and exterior parts for vehicles, such as automobiles and two-wheelers. The molded article is preferably used for these vehicle applications. Examples of the automobile interior and exterior parts are a console panel, an instrument panel, a radiator grille, a door mirror housing, a door handle, and a rear spoiler. Examples of the two-wheeler exterior parts are a handle cover, a front cover, and a body cover. In these parts, a styrene-based resin molded article for a vehicle, that does not require the conductive primer treatment among the existing coating steps, allows electrostatic coating immediately after molding, and is excellent in mechanical strength and the water resistance of a coating film after coating, can be provided.

The present invention will be further described below by way of examples. However, the present invention is not limited to these examples. In the examples, "part" indicates weight part, and "%" indicates wt. %. After molding the final resin composition by the injection molding method, various properties were measured based on the following test methods.

(1) Izod impact strength
    According to ASTM D256
(2) Flexural modulus
    According to ASTM D790
(3) Surface resistivity
    Using disk-shaped test pieces having a thickness of 3 mm obtained by injection molding, the surface resistivity was measured with a megohmmeter (manufactured by Advantest Inc.) in an atmosphere of 23° C. and humidity of 50% RH.
(4) Compatibility
    The compatibility was evaluated by bending the molded articles and observing the rupture cross-sections of the molded articles.

Evaluation criteria: ○: Good, ×: The compatibility is poor and delamination is observed.
(5) Coating test
    <Coating conditions>

| | |
|---|---|
| Coater: | automatic electrostatic rotary atomizer |
| Bell diameter: | φ 70 mm |
| Applied voltage: | −60 KV |
| Discharge: | 100 g/min |
| Distance: | 200 mm |
| Number of revolutions: | 5,000 rpm |
| Shaving air: | 1.4 Kg/cm$^2$ |
| Conveyer speed: | 5,000 mm/min |
| Test piece pitch: | 160 mm |
| Test piece: | 80 × 240 × 2 mm styrene-based resin sheet |
| Paint: | two-component curable acrylic urethane coating |
| AP-NV: | 25 wt. % |

Note) AP-NV is an abbreviation of APPLICATION NO-VOLATILE MATTER, indicating the weight proportion of the non-volatile component of the paint (a component remaining as a coating film).

<Test method>
Five test pieces to be coated were fixed on a 2,000×1,000 mm PP (polypropylene) sheet (a surface resistance of $10^{16}$ Ω or more). (The test pieces were fixed on the PP sheet at the above interval as the test piece pitch.) A ground wire was passed through the PP sheet from the back surface of each test piece, and the PP sheet with the test pieces was set on a conveyer and coated under the above conditions. After the coated sheet was baked and dried at 80° C. for 2 hrs, the following tests were conducted.

Primary adhesion: A cross-cut adhesion test using a cellophane tape according to JIS K5400 was conducted.

Water resistance: After immersing in ion-exchanged water at 50° C. for 240 hrs, the cross-cut adhesion test using a cellophane tape was conducted.

Blister resistance: After immersing in ion-exchanged water at 50° C. for 240 hrs, the blisters of the surface were observed for evaluation.

Evaluation criteria: ○: No blisters (surface roughness), ×: Blisters are observed.

Coating efficiency: Excluding the front and rear test pieces of the five test pieces, the three middle pieces were measured for the weight of the dry coating film.

Formula: $E=(W \times V \times 100/P \times D \times S) \times 100$

| | |
|---|---|
| E: coating efficiency | (%) |
| V: conveyer speed | (m/min) |
| S: the solid of the paint | (%) |
| D: discharge | (g/min) |
| W: the weight of the dry coating film | (g) |
| P: average pitch | (m) |

(The coating efficiency standard measurement method for an automatic liquid coater (Coating Equipment Manufacturers Association) was applied correspondingly.)

[Preparation of the aromatic ring-containing polyetheresteramide (A)]

PREPARATION EXAMPLE 1

A blend of 83.5 parts of ε-caprolactam, 192 parts of an ethylene oxide adduct of bisphenol A having a number average molecular weight of 2,000, 16.5 parts of terephthalic acid, 0.3 part of "Irganox 1010" (an antioxidant manufactured by Ciba-Geigy, Ltd.), 0.5 part of zirconyl stearate, 7 parts of water, and 2 parts of potassium chloride was provided in a 3 L stainless steel autoclave. After nitrogen replacement, the blend was stirred at 220° C. under pressure for 4 hours to make a homogeneous solution. Then, the solution was polymerized at 245° C. and a reduced pressure of 1 mmHg or less for 5 hours to obtain a viscous polymer. The polymer was then taken out on a belt in the form of a strand and pelletized to obtain polyetheresteramide. The reduced viscosity of the polyetheresteramide ($\eta_{SP}$/C, an m-cresol solvent, 25° C., C=0.5 wt. %, these are the same with the following examples) was 2.10. This polyetheresteramide is hereinafter called [A-1].

[Preparation of a comparative polyetheresteramide]

PREPARATION EXAMPLE 2

A blend of 105 parts of ε-caprolactam, 17.1 parts of adipic acid, 0.3 part of "Irganox 1010", and 6 parts of water was provided in a 3 L stainless steel autoclave. After nitrogen replacement, the blend was stirred at 220° C. under pressure for 4 hours to obtain 117 parts of a polyamide oligomer having carboxyl groups at both ends and having an acid value of 110. Then, 175 parts of polyoxyethylene glycol having a number average molecular weight of 1,500 and 0.5 part of zirconyl acetate were added to effect polymerization at 245° C. and a reduced pressure of 1 mmHg or less for 5 hours to obtain a viscous polymer.

The polymer was then processed in the same manner as described in Preparation Example 1 to obtain polyetheresteramide. The reduced viscosity of the polyetheresteramide was 2.10. This polyetheresteramide is hereinafter called [A-2].

[Preparation of a vinyl copolymer]

PREPARATION EXAMPLE 3

235 parts of DMF (dimethylformamide) was provided in a flask comprising a stirrer, a reflux condenser, three dropping funnels, a thermometer, and a nitrogen gas blowing nozzle. A blend of 16 parts of acrylonitrile, 75 parts of styrene, and 4 parts of glycidyl methacrylate was provided in a dropping funnel 1. A blend of 6 parts of sodium styrenesulfonate and 67 parts of DMF was provided in a dropping funnel 2. A blend of 1 part of azobisisobutyronitrile and 6 parts of DMF was provided in a dropping funnel 3. The liquid temperature in the flask was set at 80° C. The contents of the dropping funnels 1 to 3 were dropped in a nitrogen gas stream for 2 hours while maintaining the liquid temperature at 80° C. After dropping all the contents, the liquid temperature was further maintained at 80° C. for 5 hours. The solvent and unreacted monomers were removed by distillation to obtain the styrene-acrylonitrile-glycidyl methacrylate-sodium styrenesulfonate copolymer of the present invention. The amount of the sodium styrenesulfonate contained in the copolymer was 5%, the number average molecular weight was 39,000, and the glass transition point measured by DSC (differential scanning calorimetry) was 110° C. This vinyl copolymer is hereinafter called [B-1].

PREPARATION EXAMPLE 4

(A) to (C) were blended in the proportions as shown in Table 1 with a Henschel mixer for 3 minutes and then melt kneaded with a vented double-screw extruder at 230° C. and 30 rpm with a residence time of 5 minutes to obtain masterbatches (M-1) to (M-3).

TABLE 1

| | Composition of masterbatch [Numerical values indicate proportions (parts) of respective components.] | | |
|---|---|---|---|
| Masterbatch | (A) Polyetheresteramide | (B) Vinyl copolymer | (C) Styrene-based resin |
| (M-1) | [A-1] 60 | [B-1] 15 | [C-1] 25 |
| (M-2) | [A-1] 36 | [B-1] 9 | [C-1] 55 |
| (M-3) | [A-1] 36 | [B-1] 9 | [C-2] 55 |

[C-1]: ABS resin (JSR-ABS 10 manufactured by Japan Synthetic Rubber Co., Ltd.)
[C-2]: PC-ABS resin (a polymer alloy of polycarbonate resin and ABS resin, "Multilon T-3000" manufactured by Teijin Chemicals Inc.)

EXAMPLES 1 TO 3

The masterbatches (M-1) to (M-3) and the styrene-based resins (C) shown in Table 2 were blended and kneaded under the same conditions as described in Preparation Example 4. The final proportions of the components (A) to (E) of the compositions prepared by way of the masterbatches are shown in Table 2.

(Table 2)

TABLE 2

| | Masterbatch [Numerical values indicate weight proportions (parts) in 100 weight parts of resin composition | Numerical values indicate final proportions (parts) of respective components | | | | |
|---|---|---|---|---|---|---|
| | | (A) Polyetheresteramide | (B) Vinyl copolymer | (C) Styrene-based resin | (D) Metal salt | (E) Surfactant |
| Example 1 | (M-1) 20 | (A-1) 12 | (B-1) 3 | (C-1) 85 | (D-1) 0.5 | — |
| Example 2 | (M-2) 33.3 | (A-1) 12 | (B-1) 3 | (C-1) 85 | (D-1) 0.5 | (E-1) 0.5 |

TABLE 2-continued

| | Masterbatch [Numerical values indicate weight proportions (parts) in 100 weight parts of resin composition | Numerical values indicate final proportions (parts) of respective components | | | |
|---|---|---|---|---|---|
| | | (A) Polyether-esteramide | (B) Vinyl copolymer | (C) Styrene-based resin | (D) Metal salt | (E) Surfactant |
| Example 3 | (M-3) 33.3 | (A-1) 12 | (B-1) 3 | (C-2) 85 | (D-1) 0.5 | |

[D-1]: potassium chloride (added during the preparation of polyetheresteramide)
[E-1]: sodium dodecylbenzensulfonate

EXAMPLES 4 TO 6 AND COMPARATIVE EXAMPLES 1 TO 5

(A) to (E) shown in Table 3 were blended and kneaded under the same conditions as described in Preparation Example 4 to obtain styrene-based resin compositions containing the agent for providing an electrostatic coating property and improving the water resistance of a coating film according to the present invention and comparative compositions.

TABLE 3

| | Numerical values indicate final proportions (parts) of respective components. | | | | |
|---|---|---|---|---|---|
| | (A) Polyether-esteramide | (B) Vinyl copolymer | (C) Styrene-based resin | (D) Metal salt | (E) Surfactant |
| Example 4 | (A-1) 24 | (B-1) 6 | (C-1) 70 | (D-1) 1 | — |
| Example 5 | (A-1) 12 | (B-1) 20 | (C-1) 68 | (D-1) 0.5 | — |
| Example 6 | (A-1) 5 | (B-1) 1 | (C-2) 94 | (D-1) 0.5 | — |
| Comparative Example 1 | (A-1) 12 | — | (C-1) 88 | — | — |
| Comparative Example 2 | (A-1) 12 | — | (C-2) 88 | — | — |
| Comparative Example 3 | (A-2) 12 | — | (C-1) 88 | — | — |
| Comparative Example 4 | (A-2) 12 | (B-1) 3 | (C-1) 85 | (D-1) 0.5 | — |
| Comparative Example 5 | (A-2) 12 | (B-1) 3 | (C-2) 85 | (D-1) 0.5 | (E-1) 0.5 |

Performance test

Test pieces were prepared by molding the compositions of Examples 1 to 6 and Comparative Examples 1 to 5 with an injection molding machine at a cylinder temperature of 230° C., and a mold temperature of 60° C. The test pieces were evaluated for an electrostatic coating property, a mechanical property, and the water resistance of a coating film after coating. The results are shown in Tables 4 and 5. In addition, the surface resistivity of the test pieces was measured after the following treatments.

(a) The test pieces were held in an atmosphere of 23° C. and humidity of 50% RH for 24 hours.
(b) The test pieces were washed with an aqueous solution of a detergent [Mamalemon manufactured by Lion Corp.], rinsed sufficiently with ion-exchanged water, dried for removal of surface moisture, and held in an atmosphere of 23° C. and humidity of 50% RH for 24 hours.

TABLE 4

| | Properties | | | |
|---|---|---|---|---|
| | Mechanical property | | Antistatic property | |
| | Izod impact strength (Kg · cm/cm) | Flexural modulus (Kg/cm$^2$) | Surface resistivity ($\Omega$) | |
| | | | Not water washed | Water washed |
| Example 1 | 43 | 17,000 | $1 \times 10^{10}$ | $1 \times 10^{10}$ |
| Example 2 | 43 | 17,000 | $7 \times 10^{9}$ | $7 \times 10^{9}$ |
| Example 3 | 60 | 21,000 | $1 \times 10^{10}$ | $1 \times 10^{10}$ |
| Example 4 | 46 | 15,000 | $7 \times 10^{9}$ | $7 \times 10^{9}$ |
| Example 5 | 30 | 20,000 | $9 \times 10^{9}$ | $9 \times 10^{9}$ |
| Example 6 | 55 | 23,000 | $9 \times 10^{10}$ | $9 \times 10^{10}$ |
| Comparative Example 1 | 43 | 17,000 | $2 \times 10^{11}$ | $2 \times 10^{11}$ |
| Comparative Example 2 | 62 | 20,000 | $4 \times 10^{11}$ | $4 \times 10^{11}$ |
| Comparative Example 3 | 45 | 16,000 | $8 \times 10^{10}$ | $8 \times 10^{10}$ |
| Comparative Example 4 | 45 | 16,000 | $9 \times 10^{9}$ | $9 \times 10^{9}$ |
| Comparative Example 5 | 58 | 20,000 | $7 \times 10^{9}$ | $7 \times 10^{9}$ |

TABLE 5

| | Properties | | | | |
|---|---|---|---|---|---|
| | Coating property | | | | |
| | | Adhesion of coating film | | | |
| | Compat-ibility | Primary ad-hesion | Water resistance (after water immersion test) | Blister resis-tance | Coating efficiency (%) |
| Example 1 | ○ | 100/100 | 100/100 | ○ | 80 |
| Example 2 | ○ | 100/100 | 100/100 | ○ | 80 |
| Example 3 | ○ | 100/100 | 100/100 | ○ | 80 |
| Example 4 | ○ | 100/100 | 100/100 | ○ | 80 |
| Example 5 | ○ | 100/100 | 100/100 | ○ | 80 |
| Example 6 | ○ | 100/100 | 100/100 | ○ | 55 |
| Comparative Example 1 | X | 100/100 | 0/100 | X | 50 |
| Comparative Example 2 | X | 100/100 | 0/100 | X | 40 |
| Comparative Example 3 | X | 100/100 | 0/100 | X | 60 |

TABLE 5-continued

| | Properties | | | | |
|---|---|---|---|---|---|
| | | Coating property | | | |
| | | Adhesion of coating film | | | |
| | Compat- ibility | Primary ad- hesion | Water resistance (after water immersion test) | Blister resis- tance | Coating efficiency (%) |
| Comparative Example 4 | X | 100/100 | 0/100 | X | 80 |
| Comparative Example 5 | X | 100/100 | 0/100 | X | 80 |

As is apparent from Tables 4 and 5, the styrene-based resin molded articles for vehicles comprising the agent for providing an electrostatic coating property and improving the water resistance of a coating film according to the present invention has a surface resistivity, a water resistance of a coating film after coating, and a blister resistance that allow electrostatic coating, as compared with Comparative Examples 1 to 5.

Industrial Applicability

In view of the above effects, the use of the agent for providing an electrostatic coating property and improving the water resistance of a coating film according to the present invention in the styrene-based resin molded article can provide a styrene-based resin molded article that allows electrostatic coating immediately after molding without the coating of a conductive primer, without causing the blisters of the resin surface, and without deteriorating the water resistance and the mechanical strength, and provides an excellent water resistance for a coating film after coating. The styrene-based resin molded article comprising the agent for providing an electrostatic coating property and improving the water resistance of a coating film according to the present invention provides excellent effects especially in the coating applications of molded articles for vehicles, such as automobile interior and exterior parts.

What is claimed is:

1. An agent for providing an electrostatic coating property and improving a water resistance of a coating film used for a styrene resin molded article, the agent being used as a component to be mixed in the resin molded article and comprising 100 weight parts of the following polyetheresteramide (A) and 5 to 100 weight parts of the following copolymer (B):

(A) an aromatic ring-containing polyetheresteramide derived from a polyamide (a1) having carboxyl groups at both ends and having a number average molecular weight of 500 to 5,000 and an alkylene oxide adduct of bisphenols (a2) having a number average molecular weight of 1,600 to 3,000, the polyetheresteramide having a reduced viscosity of 0.5 to 4.0 (a 0.5 wt. % m-cresol solution, 25° C.); and (B) a vinyl copolymer comprising as essential constituent units a vinyl monomer (b1) having a sulfonic acid or sulfonate group and at least one monomer (b2) selected from vinyl monomers having at least one functional group selected from the group consisting of an epoxy group, an amino group and a hydroxy group that is reactive with (A), wherein a part or all of the polyetheresteramide (A) and the copolymer (B) may be reacted.

2. The agent for providing an electrostatic coating property and improving a water resistance of a coating film according to claim 1, wherein the vinyl monomer (b1) having a sulfonic acid or sulfonate group comprises an aromatic vinylsulfonic acid or salt thereof.

3. The agent for providing an electrostatic coating property and improving a water resistance of a coating film according to claim 1, wherein (B) is a copolymer comprising (meth)acrylonitrile as a constituent unit.

4. An agent for improving a water resistance of a polyetheresteramide-based agent that provides an electrostatic coating property and is used for a styrene resin molded article for a vehicle, comprising the copolymer (B) according to claim 1.

5. A styrene resin molded article for a vehicle formed by kneading a styrene resin (C) and the agent for providing an electrostatic coating property and improving a water resistance of a coating film according to claim 1 and molding the kneaded material into a desired shape.

6. The resin molded article according to claim 5, wherein (C) is a (co)polymer comprising at least one styrene selected from the group consisting of styrene and α-methylstyrene as a constituent unit and, if necessary, at least one material selected from the group consisting of (meth)acrylic ester, (meth)acrylonitrile, and butadiene.

7. The resin molded article according to claim 5, which is formed by further kneading not more than 300 weight parts of a polycarbonate resin with respect to 100 weight parts of (C) and molding the kneaded material.

8. The resin molded article according to claim 5, which is formed by kneading a masterbatch, in which the agent for providing an electrostatic coating property and improving a water resistance of a coating film and a part of (C) are kneaded, and a remaining portion of (C) and molding the kneaded material.

9. The resin molded article according to claim 5, which is formed by further kneading 5 weight parts or less of at least one metal salt (D) selected from the group consisting of alkali metals and alkaline earth metals and, if necessary, 5 weight parts or less of a surfactant (E) with respect to a total weight of 100 weight parts of (A), (B) and (C) and molding the kneaded material.

10. An electrostatically coated styrene resin molded article comprising the following polyetheresteramide (A) and the following copolymer (B) in the styrene resin molded article:

(A) an aromatic ring-containing polyetheresteramide derived from a polyamide (a1) having carboxyl groups at both ends and having a number average molecular weight of 500 to 5,000 and an alkylene oxide adduct of bisphenols (a2) having a number average molecular weight of 1,600 to 3,000, the poyetheresteramide having a reduced viscosity of 0.5 to 4.0 (a 0.5 wt. % m-cresol solution, 25° C.); and (B) a vinyl copolymer comprising as essential constituent unit a vinyl monomer (b1) having a sulfonic acid or sulfonate group and at least one monomer (b2) selected from vinyl monomers having at least one functional group selected from the group consisting of an epoxy group, an amino group and a hydroxy group that is reactive with (A).

11. The molded article according to claim 10, wherein a weight ratio of (A) to (B) is (A):(B)=100:(5 to 100).

12. The molded article according to claim 10, wherein (A) and (B) are reacted partly or wholly.

13. The molded article according to claim 10, which comprises 5 to 40 wt. % of (A) and 0.25 to 40 wt. % of (B).

14. The molded article according to claim 10, wherein (B) comprises the vinyl monomer (b1) having a sulfonic acid or sulfonate group and a vinyl monomer having an epoxy group.

15. The molded article according to claim 10, wherein (B) comprises (meth)acrylonitrile as a constituent unit.

16. The molded article according to claim 10, wherein the styrene resin is a (co)polymer comprising at least one styrene selected from the group consisting of styrene and α-methylstyrene as a constituent unit and, if necessary, at least one material selected from the group consisting of (meth)acrylic ester, (meth)acrylonitrile, and butadiene.

17. The molded article according to claim 10, further comprising 300 weight parts or less of a polycarbonate resin with respect to 100 weight parts of the styrene resin.

18. A vehicle member comprising the molded article according to claim 10.

19. A method for electrostatically coating a styrene resin molded article, comprising the step of mixing the following (A) and (B) in a styrene resin:

(A) an aromatic ring-containing polyetheresteramide derived from a polyamide (a1) having carboxyl groups at both ends and having a number average molecular weight of 500 to 5,000 and an alkylene oxide adduct of bisphenols (a2) having a number average molecular weight of 1,600 to 3,000, the polyetheresteramide having a reduced viscosity of 0.5 to 4.0 (a 0.5 wt. % m-creso, 25° C.); and (B) a vinyl copolymer comprising as essential constituent units a vinyl monomer (b1) having a sulfonic acid or sulfonate group and at least one monomer (b2) selected from vinyl monomers having at least one functional group selected from the group consisting of an epoxy group, an amino group and a hydroxy group that is reactive with (A).

\* \* \* \* \*